May 10, 1966 G. K. CASPARI 3,250,464

BINARY TO DECIMAL CONVERTER

Filed Oct. 29, 1963 7 Sheets-Sheet 1

INVENTOR.
GEORG K. CASPARI

INVENTOR.
GEORG K. CASPARI

INVENTOR.
GEORG K. CASPARI

BINARY TO DECIMAL CONVERTER

Filed Oct. 29, 1963 7 Sheets-Sheet 4

INVENTOR.
GEORG K. CASPARI

INVENTOR.
GEORG K. CASPARI

INVENTOR.
GEORG K. CASPARI

BINARY TO DECIMAL CONVERTER

Filed Oct. 29, 1963 7 Sheets-Sheet 7

INVENTOR.
GEORG K. CASPARI 3,250,464

BINARY TO DECIMAL CONVERTOR

Georg K. Caspari, Detroit, Mich., assignor to Burroughs Corporation, Detroit, Mich., a corporation of Michigan Filed Oct. 29, 1963, Ser. No. 319,836
13 Claims. (Cl. 235—61)

The present invention relates generally to an apparatus for converting electrical signals coded in accordance with digital values into an equivalent mechanical movement and is particularly directed to means for converting electrical signals coded in binary notation to mechanical movements representing an equivalent decimal value.

While such a convertor may have many applications, one specific application is discussed for convenience of description, i.e., a mechanical positioning system for a high speed serial printer. The various alphanumeric characters comprising the font of type are arranged in columns and rows around the outside periphery of a drum or sphere, the row and column position of individual type face determining its digital address. According to the invention, the selection of a particular character to be printed causes a decoding matrix to provide electrical pulses to the solenoids of the convertor. The selection of a particular character may be accomplished by the depression of a key, a tape storage unit, or a similar device. The solenoids of the convertor each operate a clutch which affects the movement of an eccentrically mounted ring member to one of two stable positions. Each stable position of an eccentric ring represents a binary quantity. The movement of the rings through a linkage produces a mechanical movement which is equal to the decimal equivalent of the binary output from the decoding matrix.

An object of the invention is to provide a data conversion system which will operate to convert binary qualities into equivalent decimal quantities.

Other features, objects, and advantages of the invention will become apparent from the following specification read in connection with the accompanying drawings in which.

Figure 4:
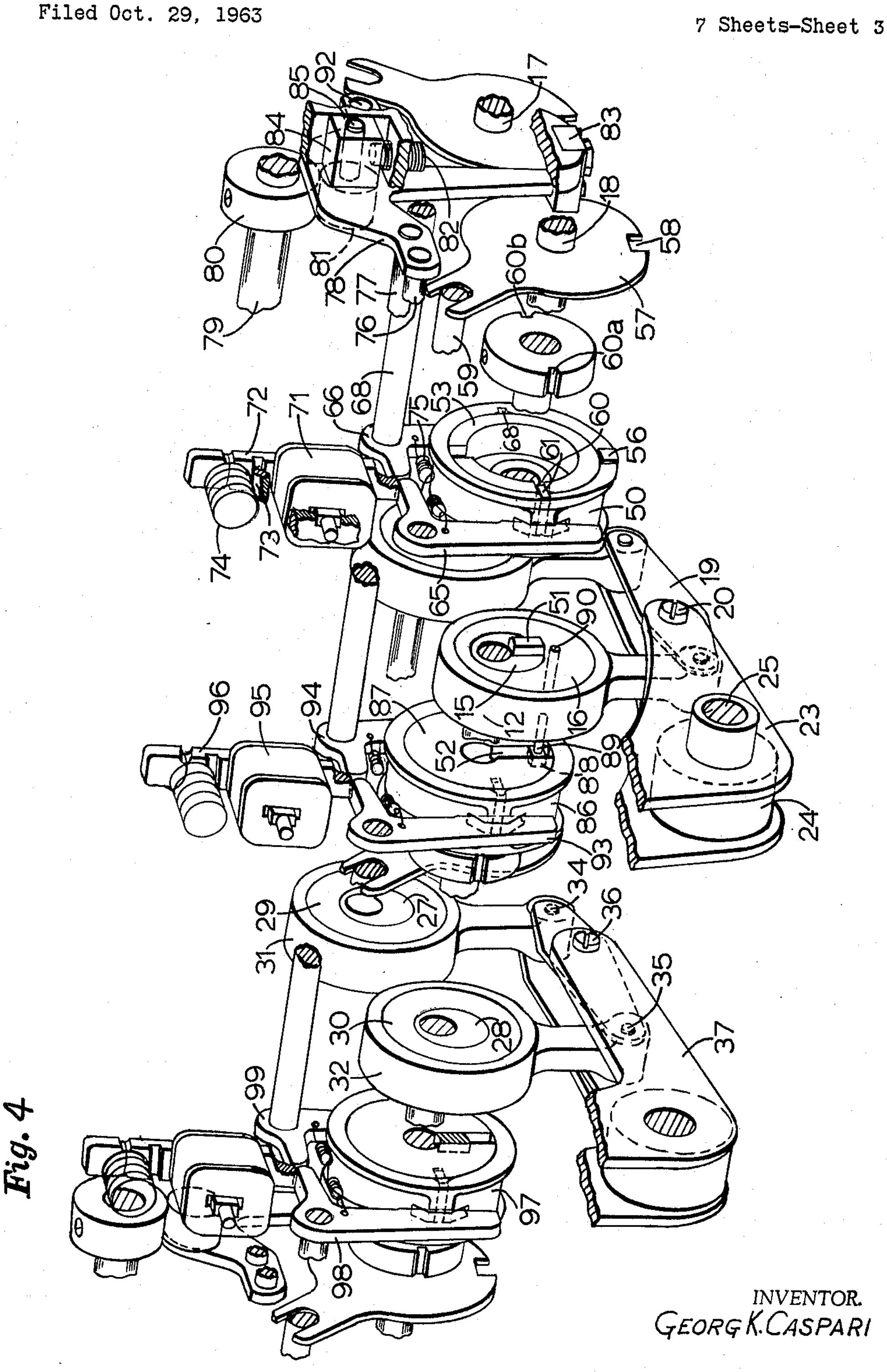
FIG. 4 is an exploded perspective view of the device of FIG. 1.
Figures 7A, 7B:
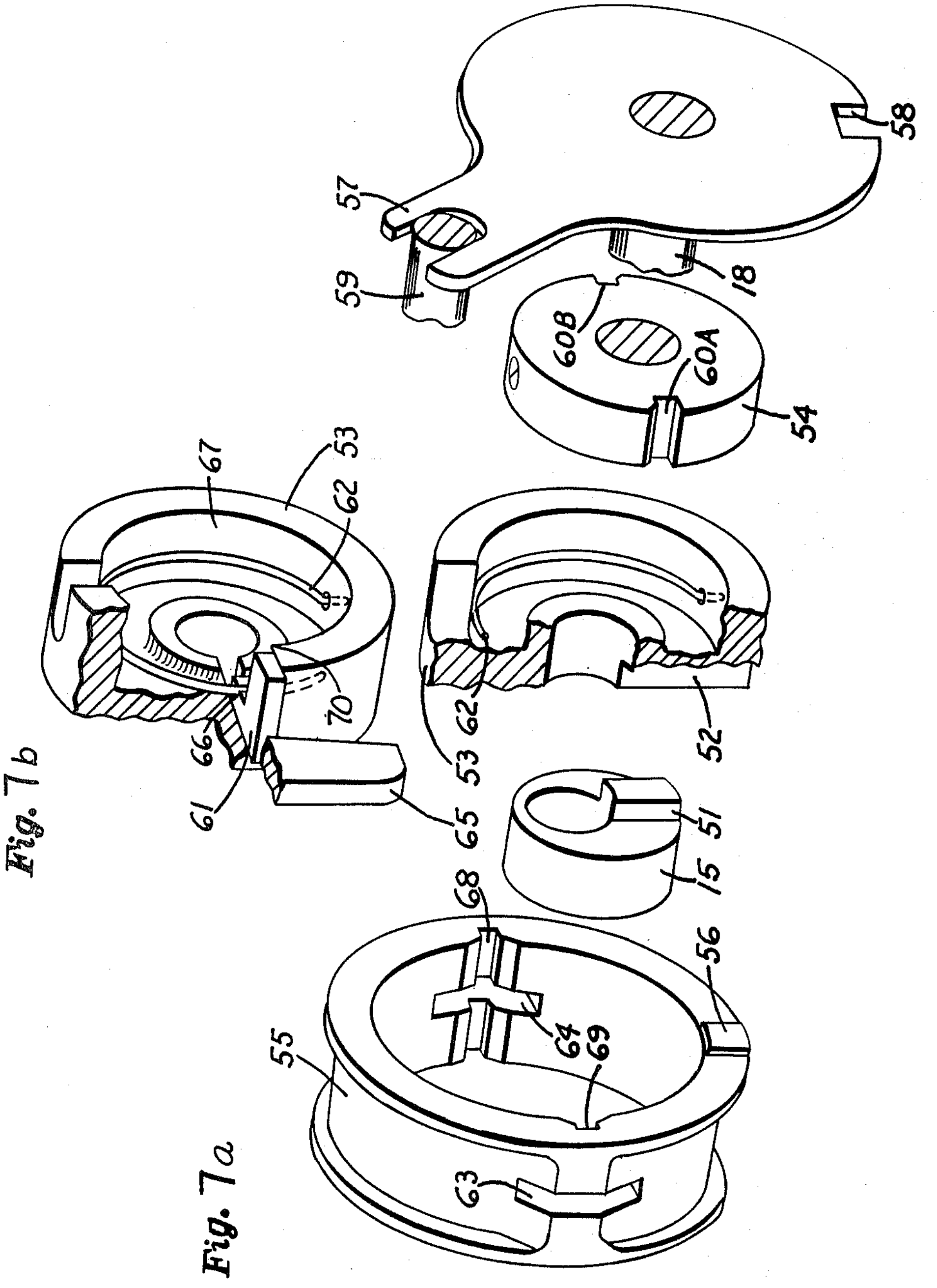
Figure 9:
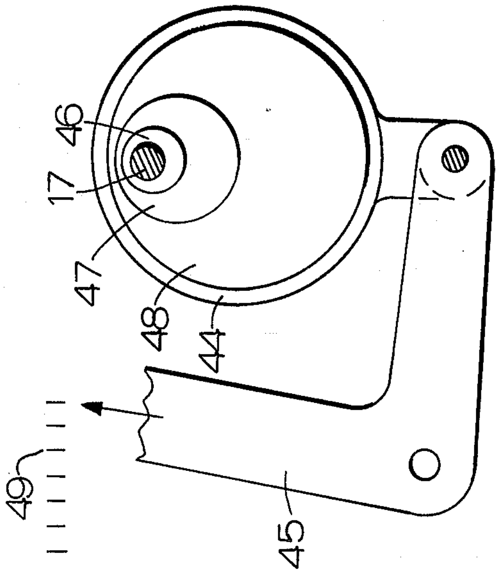
Figure 8:
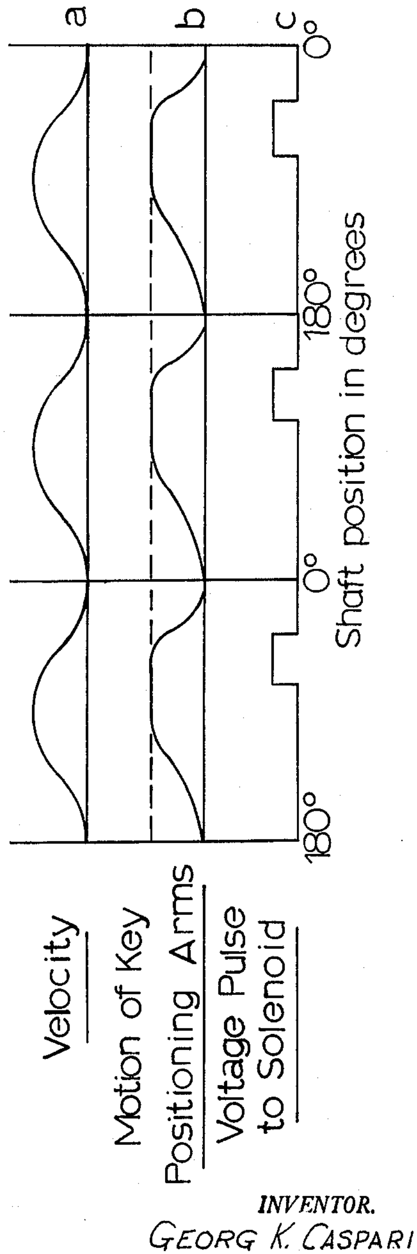

FIG. 7*a* is an exploded perspective view showing the details of one of the clutches of FIG. 4;

FIG. 7*b* is a perspective view showing a portion of the clutch of FIG. 4 with the clutch key;

FIG. 8*a* is a graph illustrating the relationship between the velocity of one of the clutch supporting shafts and its angular position;

FIG. 8*b* is a graph illustrating the relationship between the position of a key positioning arm and the angular position of a clutch supporting shaft;

FIG. 8*c* is a graph illustrating the time relationship between the application of output pulses from the decoding matrix and the angular position of a clutch supporting shaft;

FIG. 9 shows an alternate embodiment of the converter device utilizing three eccentrically mounted rings within one housing.

Figure 1:
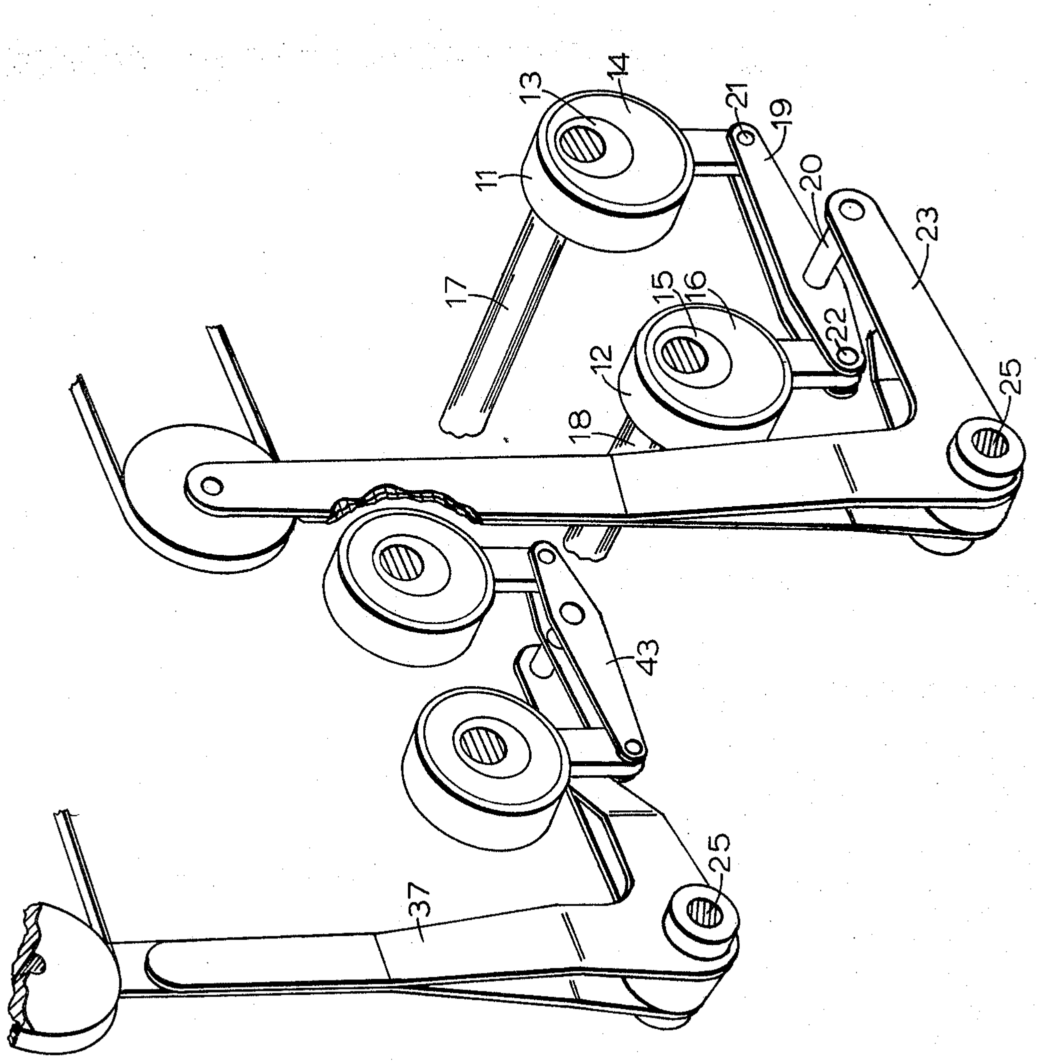
FIG. 1 is a perspective view of two convertor units mounted on common shafts, two indicating arms each associated with one of the convertors, and a linkage for connecting each convertor to its indicating arm.
Figure 3:
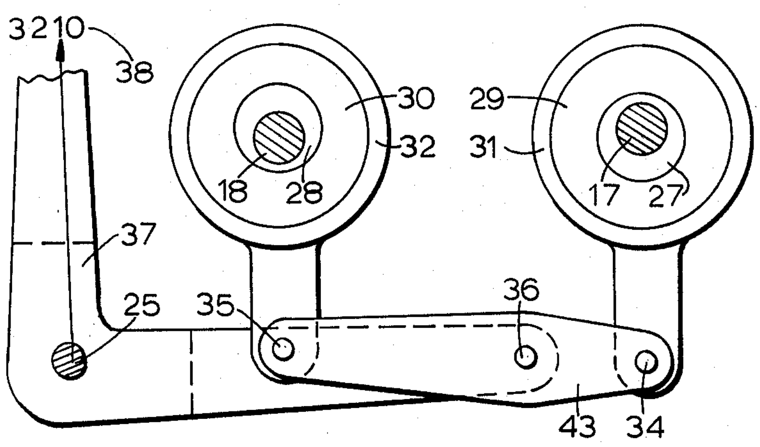
FIG. 3 is an elevation of the leftmost of the convertor units of FIG. 1.
Figure 2:
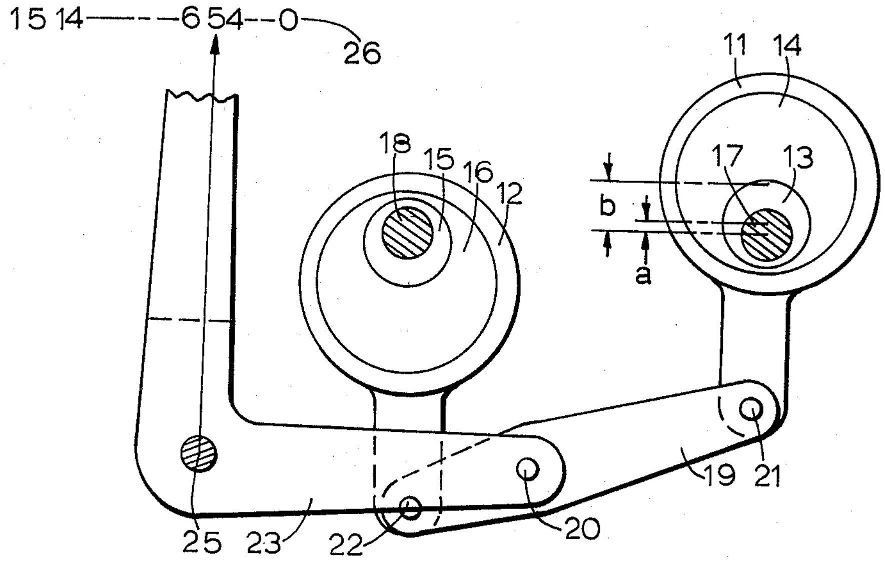
FIG. 2 is an elevation of the rightmost of the convertor units of FIG. 1.

Referring to FIGS. 1–3 together, the manner in which the device converts binary information to mechanical movement representing the decimal equivalent of the binary quantity may be seen. It will be helpful to view the operation of only one of the convertors as seen in FIGS. 1 and 2. The convertor comprises eccentric housings 11 and 12 in which are contained eccentrically mounted rings 13–16.

These rings 13–16 are designated as eccentrically mounted because of their eccentricity with respect to supporting shafts 17 and 18. Rings 13 and 14 are mounted eccentrically on shaft 17 while rings 15 and 16 are mounted eccentrically on shaft 18. Outer eccentric ring 14 is contained within and also rotatable within housing 11 about shaft 17. Inner eccentric ring 13 is contained within a circularly cut out portion of outer ring 14 and is free to rotate within outer eccentric ring 14 about shaft 17 which extends through a circularly cut out portion of inner ring 13. Eccentric housing 11 has a downwardly depending portion pivotally affixed at point 21 to a link 19.

The other end of link 19 has the downwardly depending portion of eccentric housing 12 also pivotally affixed thereto at point 22. Outer eccentric ring 16 is rotatable within housing 12 and contains an inner eccentric ring 15 in a circularly cut out portion thereof. Inner ring 15 is rotatable within the cut out portion of ring 16 in which it is contained. A circularly cut out portion of ring 15 contains shaft 18.

The relative size of each inner ring to its associated outer ring is shown at FIG. 2, rings 13 and 14 serving as examples. The distance $a$ between the center of shaft 17 and the center of ring 13 is one-fourth the distance $b$ between the shaft center and the center of ring 14. Also, corresponding parts of the convertor such as the two inner and two outer rings are of identical size.

Link 19 is connected to pin 20 at a bearing point, not shown, which permits link 19 to rotate about pin 20. Pin 20 is rigidly secured at one end to a rightly extending portion of indicating arm 23. It is to be noted that the distance between point 21 and the center of pin 20 is exactly twice the distance as between point 22 and the center of pin 20. Arm 23 is rotatably mounted about fixed shaft 25 by means of hub 24. Thus, an upward movement of pin 20 causes indicator arm 23 to rotate about shaft 25 in a counterclockwise direction, while a downward movement of pin 20 causes arm 23 to rotate about shaft 25 in a clockwise direction. The end of indicator arm 23 remote from pin 20, connected to a pulley or similar mechanism, is displaced leftwardly by a counterclockwise rotation of indicator arm 23 and rightwardly by a clockwise rotation thereof.

As seen in FIG. 1, rings 13–16 are all positioned so that their eccentric lobes are pointing downwardly, hereafter referred to as the downward position, placing indicator arm 23 in its most clockwise position. As shown in FIG. 2, the rotational movement of arm 23 may be defined by the linear displacement of its upwardly extending portion as indicated by scale 26. The relative displacement of the arm 23 is, of course, equivalent to the relative linear displacement of the pulley of FIG. 1. The downward position of rings 13–16 would give a zero reading on scale 26.

In a manner to be described infra, each eccentric ring may be rotated by a clutch mechanism to assume one of two stable positions. That is, each ring may be rotated about its associated shaft so its lobe portion is either pointing upwardly or downwardly. For present purposes, it suffices to say that each ring may be placed in one of the two positions in any manner such as by hand.

Each eccentric ring in the present invention represents either a binary 0 or a binary 1 depending on its position. The downward position represents a binary zero while the upward position represents a binary one. Each eccentric ring has a different binary weight as its rotation from one binary position to another has a different relative effect on the rotation of arm 23. As is apparent from FIG. 2, the rotation of eccentric ring 13 causes less rotation of arm 23 about shaft 25 than does the rotation of any of the other rings. Thus, the weighting effect of ring 13 is such that it represents the least significant digit of the number represented by the four rings 13–16. If rings 14–16 remain in the downward position and ring 13 is moved upwardly, the arm 23 will move from the 0 position to the one position on scale 26.

If all the rings are positioned downwardly and ring 15 is rotated so that its lobe extends upwardly, arm 23 would move from the 0 to the 2 position. Housing 12, of course, moves upwardly the same distance as did housing 11 when ring 13 was rotated. Housing 11 is twice as far away from pin 20 as is housing 12 and the movement of housing 12 will cause twice the arcuate movement of pin 20 as will the movement of housing 11. Eccentric ring 15, therefore, has twice the binary weighting effect of ring 13.

In order to understand the weighting effect of the two outer eccentric rings 14 and 16, assume all the rings are in the downward position of FIG. 1. If ring 14 is rotated 180° to the upward position, it will produce four times as much rotational movement of arm 23 as did the 180° rotation upwardly of ring 13. Thus, ring 14 has four times the binary weight of ring 13 because its center is four times as far away from the center of shaft 17 as is the center of ring 13. Similarly, ring 16 has twice the binary weight of ring 14 because point 21 is twice as far away from pin 20 as is point 22 and the center of ring 16 is four times as far away from the center of shaft 18 as the center of ring 15. It can be seen that rings 13, 15, 14 and 16 have respective binary weights of 1, 2, 4 and 8.

Referring to FIG. 2, rings 13 and 14 have been rotated 180° from the 0 position to the one or upward position. The rings therefore indicate 0101 in binary notation or 5 in the decimal system as seen from the position of arm 23 on scale 26. Since eccentric rings 15 and 16 both point downwardly, point 22 has not been displaced from its most downward or lowest position. The upward movement of housing 11 has raised the right end of link 19 and caused upward movement of pin 20. The bearing in link 19 which surrounds pin 20 has, of necessity, rotated but pin 20 has moved upwardly without rotation. It is noted that only the upward or downward movement of pin 20 effects the rotation of arm 23. The bearing in link 19 accommodates the rotation of the link.

As a further example, assume all of the eccentric rings of the FIG. 2 embodiment are rotated 180° from their zero or downward position. Arm 23 would then be in its most counterclockwise position and indicate (15) on scale 26, which is the decimal equivalent of binary 1111.

The leftmost convertor system of FIG. 1, also shown at FIG. 3, has only two eccentrically mounted rings 27 and 28. These rings 27 and 28 are contained within the circularly cut out portions of spacers 29 and 30 and are also mounted eccentrically with respect to shafts 17 and 18. Rings 29 and 30 are not eccentrically mounted on their respective shafts and are not utilized to represent binary quantities but are only spacers contained within housings 31 and 32 respectively. Housings 31 and 32 are pivotally affixed to link 43 at points 34 and 35 respectively. Pin 36 is bearing mounted within link 43 and attached to the rightwardly extending portion of indicator arm 37. The FIG. 3 embodiment is assembled in the same manner as the FIG. 2 embodiment and operates in a similar maner. Note, however, that the distance between point 34 and pin 36 is equal to exactly one-half the distance between point 35 and pin 36. Thus, eccentric ring 27 has twice the binary weight as ring 27. If it were desired, pin 36 could be positioned in link 43 so that ring 28 had twice the binary weight as ring 27.

When eccentric rings 27 and 28 are in a downward position, indicating arm 37 reads 0 on scale 38. When eccentric ring 28 is rotated 180° to its upward position and ring 27 remains in its downward position, arm 37 indicates 1 on scale 38 (FIG. 3). If ring 27 were rotated 180° and ring 28 pointed downwardly, arm 37 would indicate 2 on scale 38. When both rings point upwardly, arm 37 indicates a 3 on scale 38.

Utilizing the two convertor units together as illustrated at FIG. 1, a 4 by 16 numerical output may be obtained by simultaneously rotating selected ones of the six eccentrically mounted rings 180° about its associated shaft. Such an output can be used to control the simultaneous movement in two directions of a cylinder or sphere having a type font arranged in columns and rows. One convertor, for example, may be used to select the column in which a desired character of type is located while the other convertor simultaneously selects the position in the column of the character. Of course, if more than two simultaneous conversions were required, additional units could be mounted on the two shafts. Also, eccentric rings could be substituted for spacers 29 and 30 to enlarge the output of the convertor unit of FIG. 1 from a 4 x 16 numerical output to a 16 by 16 output.

FIG. 9 illustrates an alternate embodiment utilizing only one eccentric ring housing rigidly connected directly to the rightwardly extending portion of indicator arm 45. This embodiment of the invention utilizes three rings 46–48 within housing 44, all three rings being eccentrically mounted about shaft 17. The rings are of such proportions that the distances from the shaft center to the center of each ring is in the ratio of 1:2:4. Each ring is rotatable within the circularly cut out portion of the next larger ring in which it is contained. The largest eccentrically mounted ring is rotatable within housing 44. This embodiment operates similarly to the embodiments illustrated at FIGS. 2 and 3. A rotation of 180° of any of the rings so that its eccentric lobe points upwardly rotates arm 46 counterclockwise. The weighting effect of each eccentric ring is determined by the relative amount that its center is offset from the center of the shaft. Indicating arm 45 is in the 0 or most clockwise position as shown on scale 49 when the eccentric lobes of all three of the rings are pointing downwardly.

Referring to FIGS. 1–3 and 9 together, it is seen that any number of eccentrically mounted rings may be positioned within one eccentric housing without departing from the spirit of the invention. Note that the numerical capacity of a convertor unit may be expanded either by mounting additional eccentric rings within a housing or by adding a second eccentric housing as shown at FIGS. 1–3. Of course, if only one eccentric housing is used, as in FIG. 9; the whiffle-tree arrangement of FIGS. 1–3 may be eliminated as the housing is rigidly attached directly to the indicator arm. For example, two eccentric rings could have been used within one housing in the FIG. 3 embodiment. This would have eliminated one housing and the whiffle-tree mounting arrangement. The particular arrangement selected is determined by considerations such as the amount of space available and the costs of the various parts.

In operation, it is desirable to provide a means of simultaneously rotating selected eccentric rings so as to provide a binary-to-decimal conversion at the speeds which are compatible with modern high-speed devices. The clutches and associated mechanisms which accomplish this high-speed rotation of the eccentric rings are illustrated in FIGS. 4, 7*a* and 7*b*.

The two shafts 17 and 18 which support the six eccentrically mounted rings shown in FIG. 1 are intermittent motion shafts. These shafts approach a near zero velocity at the 0° and 180° positions as viewed from the righthand side of FIGS. 4 and 7 and have a maximum velocity at the 90° and 270° positions. The means for providing such an intermittent motion is conventional and has not been illustrated. Half revolution clutches of a unique design are provided for each eccentric ring on a one-to-one basis. These clutches perform the selection of any desired binary combination of the eccentric rings by being engaged or disengaged at the low velocity periods of the two shafts. When a clutch is engaged, it causes its associated eccentric ring to rotate 180° to either the binary 0 or binary 1 position. If a particular ring is in the binary 1 position and its associated clutch is engaged, the ring will rotate 180° to the binary 0 position and vice versa.

An exploded view of clutch 50 of FIG. 3 is shown at FIGS. 7*a* and *b*, particularly illustrating the manner in which eccentric ring 15 is rotated from one binary indicating position to the other. Ring 15 has a lug 51 which is received in slot 52 of an inner clutch housing 53, both ring 15 and inner housing 53 being supported by shaft 18. Also supported by shaft 18 and contained within inner housing 53 is a driver 54. Driver 54 is secured to shaft 18 by a set screw and rotated therewith. Outer clutch housing 55 surrounds the assembly of the driver and the inner clutch housing and contains a pip 56. Pip 56 is in registry with notch 58 of a retainer plate 57 also supported by shaft 18. Retainer plate 57 has a fingered portion which surrounds a retainer shaft 59. Shaft 59 is fixed and prevents retainer plate 57 from rotating about shaft 18. Also, the registry of pip 56 with notch 58 retains outer housing 55 in the position illustrated in FIG. 3 and prevents its rotation about shaft 18.

A key 61 is positioned within inner housing 53 as seen at FIG. 7*b*. This key is slidable within keyslot 60 against the outwardly directed force of a circular spring 62 contained within housing 53. One end of spring 62 is bent and inserted into a bore hole in the inner housing. Spring 62 engages key 61 near its free end by means of groove 66 in the key.

As seen most clearly at FIG. 7*a*, outer housing 55 contains two vertically oriented slots 63 and 64. These slots, located at the 0° and 180° position, are adapted to receive therein key actuating arms 65 and 66 respectively. Arm 65 is affixed on and rotatable about retainer shaft 59 while arm 66 is affixed on and rotatable about retainer shaft 68. The counterclockwise rotation of arm 65 causes it to enter slot 63. If key 61 is in the 180° position, arm 65 pushes the key radially inwardly against the force of spring 62. When the key travels in keyslot 60 far enough to pass the interior surface 67 of housing 53 it engages keyslot **60*a* of driver 54. The key is of a size in relation to the wall thickness of inner housing 53 that it will not protrude into the keyslot 69 in the outer housing when it engages the keyslot of the driver. The insertion of the key into keyslot 60*a* causes the inner housing to rotate with the driver. The key is pushed outwardly by spring 62 against the inner surface of outer housing 55** during its rotation but this frictional contact is not sufficient to impede the rotation of the inner housing.

The inner housing rotates 180° until the outward push of spring 62 pushes the key into the second keyslot 68 of the outer housing located at the 0° position as shown in FIG. 7*a*. If it is desired that the inner housing rotate an additional 180° or a total of 360°, then arms 66 would be rotated clockwise into slot 64 prior to the arrival of the key at the 0° position. The insertion of arm 66 into slot 64 prevents key 61 from being pushed outwardly into keyslot 68. Since the key cannot be pushed radially outwardly far enough so that its inner end frees itself in the keyslot of driver 54, the inner housing will continue to rotate.

If arm 65 is not rotated counterclockwise, key 61 will move radially outwardly under the force of spring 62 when it arrives at the 180° position. This outward movement causes key 61 to leave keyslot **60*a*** of the driver, and consequently, the rotation of the key and the inner housing ceases.

As shown in FIGS. 4 and 7*a*, key 61 may be driven inwardly either by arm 65 at the 180° position or by arm 66 at the 0° position. The rotational velocity of intermittent motion shaft 18 is approximately zero when the keyslots of the driver are in the 0° and 180° positions. This reduction in velocity facilitates the movement of the key either inwardly or outwardly. When the key is moved inwardly by one of the arms at the 0° or 180° position, the inner housing is rotated because the key engages one of the keyslots of the driver. If the key is moved outwardly at either the 0° or 180° position, the rotation of the inner housing ceases because the key will no longer engage one of the keyslots of driver.

The selective rotation of key positioning arms 65 and 66 permits selective rotation of the inner housing 53. If an arm adjacent the key is rotated into its vertical slot, the housing will rotate 180°. If the arm adjacent the key is withdrawn from its slot, the rotation of the inner housing ceases although the driver will continue to rotate.

As seen in FIGS. 4 and 7*a*, inner eccentric ring 15 has a lug 51 which is inserted into slot 52 when the device is assembled. Thus, whenever inner housing 53 rotates about shaft 18, eccentric 15 also rotates. If inner housing 53 rotates from the 180° position of FIGS. 3 and 7*b*, ring 15 will rotate clockwise from the 270° to the 90° position. Recalling that the downwardly pointing position of ring 15 is representative of a binary 0, a rotation of 180° from its downward position would cause ring 15 to indicate a binary 1. The rotation of eccentric ring 15 is controlled by the movement of the key positioning arms 65 and 66. The ring is rotated to provide a binary indication every half cycle of rotation of shaft 18. Assume, as an example, that key 61 is at the 180° position and arm 65 has been rotated counterclockwise. Ring 15 will remain in the binary 0 position as key 61 travels from the 180° position to the 0° position in a clockwise direction. While the key is traversing this arcuate path of 180°, the matrix decoding circuit controls the rotation of key positioning arm 66 about retainer shaft 68 in a manner to be explained. If arm 66 is rotated clockwise so that it enters vertical slot 64, key 61 will not be able to travel outwardly into keyslot 68 at the 0° position. If key 61 does not travel outwardly, its inner edge continues to protrude into keyslot 60. The rotation of driver 54 will then carry the inner housing and the key back to the 180° position and ring 15 will rotate back to the 0 binary position.

Assume as another example that the matrix decoding circuit causes ring 15 to remain in the binary 1 position while the driver rotated from the 0° to the 180° position. In order to accomplish this, the rotation of the inner housing must be stopped at the 0° position and arm 66 must be rotated counterclockwise to withdraw it from vertical slot 64. When the key 61 reaches the 0° position, spring 61 urges it radially outwardly into keyslot 68. When key 61 enters keyslot 68, its inner portion no longer extends into the keyslot **60*a*** on the driver. Thus, the rotation of the inner housing is stopped at the 0° position.

Suppose it is desired to have ring 15 indicate a binary 0 during the time that the driver rotated from the 180° position of FIGS. 3 and 7*a* to the 0° position. To accomplish this, arm 65 must be withdrawn from vertical slot 63 when key 61 is in the 180° position. Thus, key 61 will move radially outwardly into keyslot 69 and will not engage keyslot **60*a* on the driver. Note that driver 54 has two keyslots 60*a* and 60*b* positioned 180° apart. If it should be desired to rotate ring 15 to the 1 position on the next half cycle, arm 65 will insert the key into keyslot 60*b* which will have come to the 180° position. The binary indicating position of ring 15 may, therefore, be changed every half cycle or 180° of rotation of shaft 18. The rotary speed of shaft 18** determines the speed of the binary-to-decimal conversion of the device as two conversions occur every 360° of rotation of the shaft.

Figure 5:
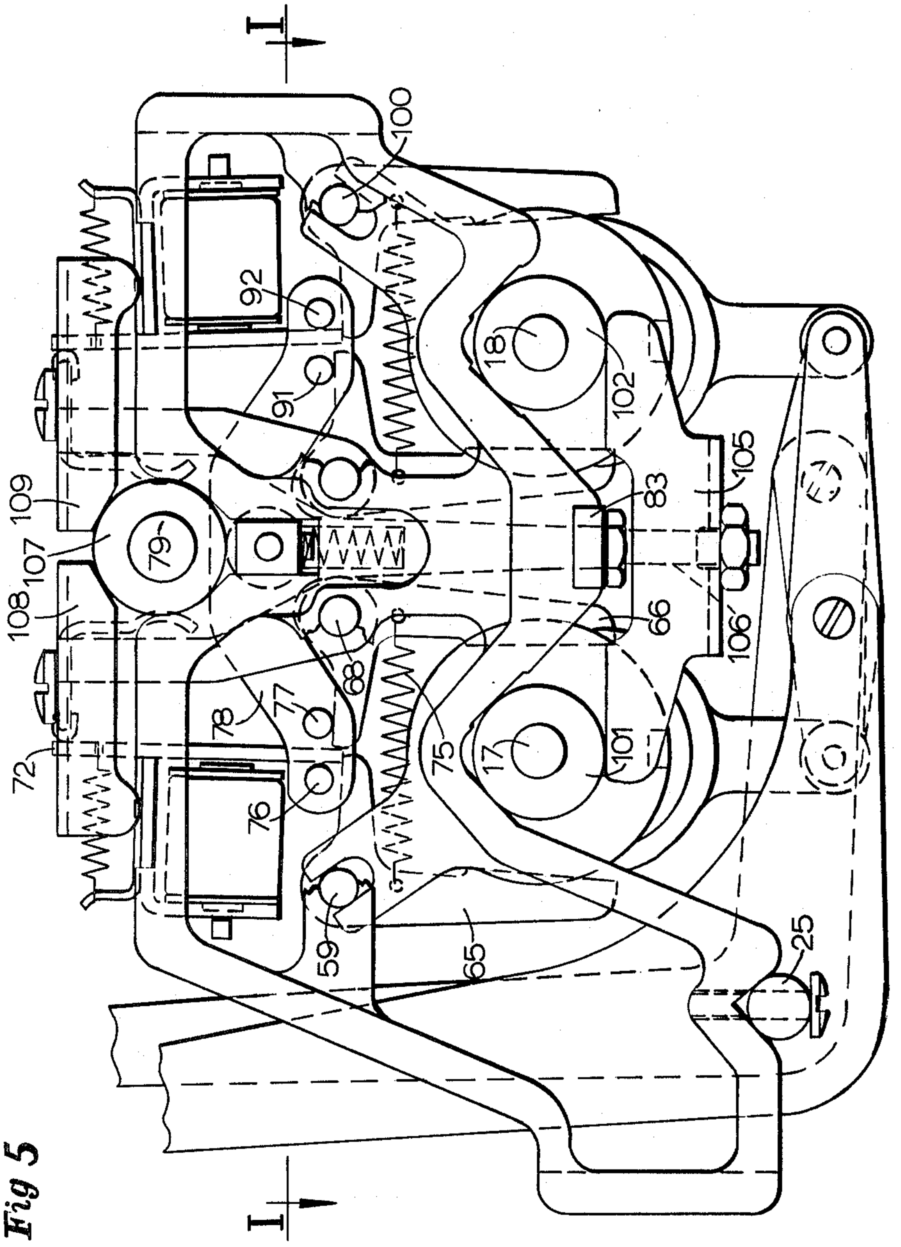
FIG. 5 is a front elevation of the device of FIG. 4.

Referring to FIGS. 4 and 5 together, the operation of key positioning arms 65 and 66 may be seen. Spring 75 connected between both arms exerts a constant force tending to rotate them into their respective vertical slots 63 and 64 in the outer housing. Solenoid 71 has a clapper 72 which is pivoted on a portion of the casting 73. The energization of the solenoid draws the clapper toward it against the force of clapper spring 74. When solenoid 71 has been energized, as seen in FIGS. 4 and 5, the bottom portion overlies the top of the arm 65 and prevents spring 75 from rotating the arm counterclockwise. Since arm 65 cannot rotate counterclockwise, key 61 cannot be moved radially inwardly to engage one of the keyslots of driver 54. The energization of solenoid 71 has drawn clapper 72 away from the leftwardly extending portion of arm 66 and that arm is free to rotate clockwise under the pull of spring 75. Thus, if solenoid 71 is energized, arm 66 will enter its vertical slot but arm 65 will not. If the solenoid is not energized, arm 65 will enter its vertical slot but arm 66 will not. Thus, pulses to solenoid 71 control the position of the key positioning arms 65 and 66, ultimately controlling the binary indicating position of eccentric ring 15.

In order to allow clapper to travel freely from one position to another, it is necessary to rotate both arms away from the clapper so that the position of the clapper may be changed. As seen in FIG. 5, clapper 72 cannot be moved to the right to overlie arm 66 until the leftward extending portion of the arm is moved downwardly away from the end of the clapper. To this end, knockout shafts 76 and 77, which overlie the horizontal positions of arms 65 and 66 respectively, are provided. Prior to the time that the decoding matrix causes the clapper to assume one of its two positions for the next half-cycle, knockout shaft 76 and 77 are moved downwardly. This downward movement clears arms 65 and 66 away from the bottom end of clapper 72. The downward movement of shafts 76 and 77 is effected by the rotation of cams 80 at the front and rear ends of the device, both mounted on cam shaft 79. The knockout shaft actuating mechanisms are identical and only the one at the front end will be referred to for clarity in the following explanation. Ball bearing follower 81 is attached to a knockout slide 78 to which knockout shafts 76 and 77 are also attached. The lower end of knockout shaft 78 is vertically slidable in plastic block 83. Follower 81 is also attached to block 84 by stud 85, block 84 being free to slide vertically within a groove in the casting. Followers 81 are held in contact with cams 80 by the force of a biasing spring 82 which has its lower end fixed to the casting and its upper end attached to the bottom of blocks 84. When shaft 79 rotates to the position where the eccentric lobe of the cam points downwardly, block 84 compresses spring 82 and knockout slide 78 moves downwardly. The downward movement of the knockout slide carries shafts 76 and 77, rotating both key positioning arms 65 and 66 away from the end of clapper 72. During the time that key positioning arms 65 and 66 are moved away from the end of the clapper, solenoid 71 is energized or deenergized, and the clapper position is changed. Of course, the clapper position can be left in the same position and not changed during the period that the knockout shafts are depressed.

Outer eccentric ring 16 is rotated by a clutch 86 which operates in an identical manner as clutch 50. Clutch 86 is supported by shaft 18 and is positioned so that the slot 52 in inner housing 87 is adjacent outer eccentric ring 16 (FIG. 4). Slidably positioned with slot 52 is a block 88 having a horizontally extending pin 89. Outer eccentric ring 16 has a horizontally extending bore 90 into which pin 89 is inserted upon assembly. Pin 89 carried by inner housing 87 causes the rotation of ring 16 in the identical manner as lug 51 carried by inner housing 53 causes the rotation of ring 15. The sliding block arrangement for connecting ring 16 to inner housing 87 has been provided to permit inner ring 15 to rotate independently of outer ring 16. If ring 16 remains in the binary 0 position and ring 15 is rotated to the binary one position, housing 12 is, of course, raised. The raising of housing 12 causes ring 16 to raise. When ring 16 is raised, pin 89 is raised and block 88 slides upwardly in guide slot 52. If pin 89 could not be moved upwardly, the pin would be bent by the upward movement of the housing when ring 16 remained in the binary 0 position.

Figure 6:
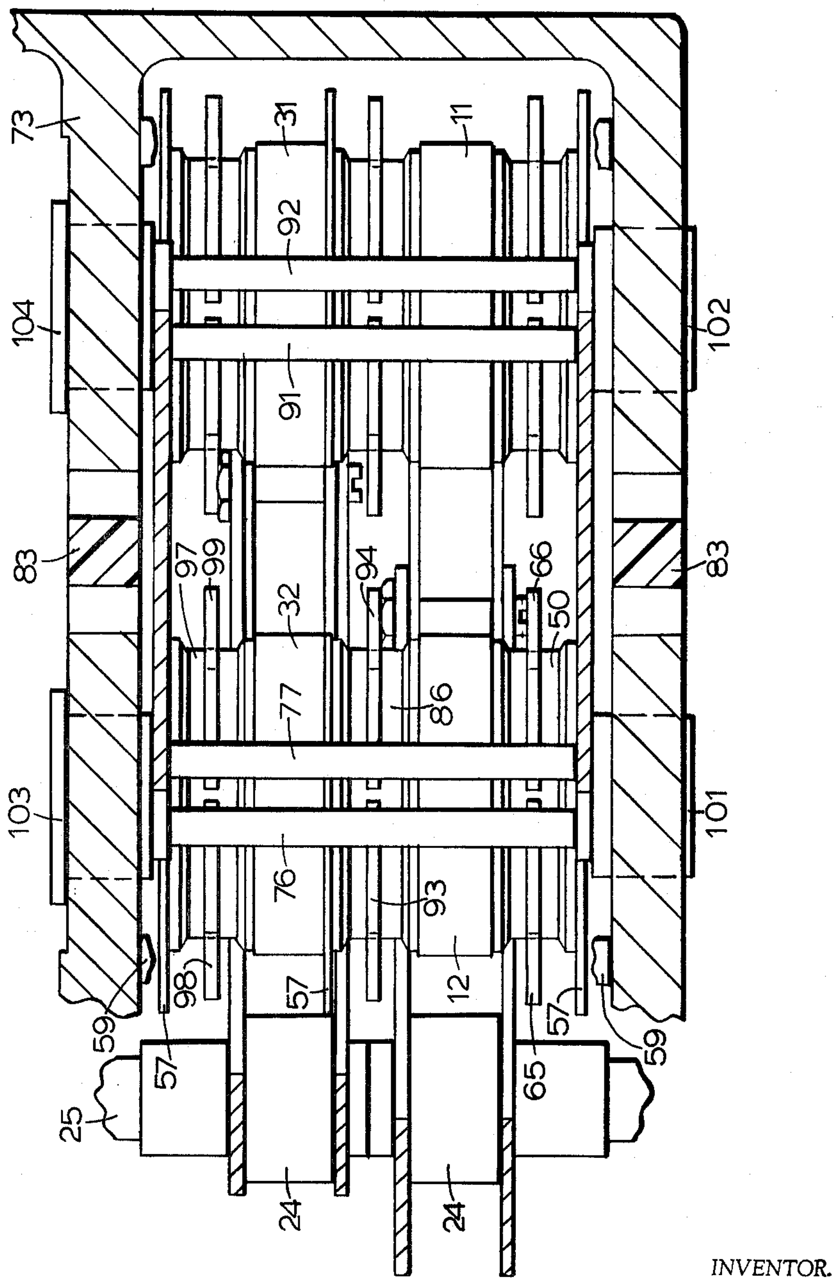
FIG. 6 is a section view of the device taken along lines I—I of FIG. 5.

The physical arrangement of the assembled device can be understood by viewing FIGS. 4–6 together. The device contains six eccentric rings contained within four housings, two of the housings containing one ring each plus a spacer. Rings 15, 16, and 28 are supported by shaft 18 while rings 13, 14, and 27 are supported by shaft 17. All of the inner eccentric rings are driven in the same manner as ring 15 and all of the outer eccentric rings are driven in the same manner as ring 16, as each ring having a clutch associated therewith. Each clutch and key positioning arm mechanism operates in the manner discussed above. FIG. 6, taken along lines I—I of FIG. 5, shows the spacial relationship between the clutches and the eccentric housings. Housing 12 has clutch 50 positioned on one side thereof and clutch 86 on the other side, these clutches rotating rings 15 and 16 respectively. Housing 32 has a clutch 97 positioned at its rear, this clutch controlling the rotation of eccentric ring 28 by means of key positioning arms 98 and 99.

All of the clutches located on the left side of the device and supported by shaft 18 have their outer housings prevented from rotation by a retainer plate 57 surrounding retainer shaft 59. Knockout shafts 76 and 77 overlie each pair of key positioning arms on the left side of the device; i.e., arms 65 and 66 of clutch 50, arms 93 and 94 of clutch 86 and arms 98 and 99 of clutch 97.

The three clutches and two housings located on the right side of the device and supported by shaft 17 are identically arranged. Shaft 17 is, of course, an intermittent motion shaft which rotates in exactly the same manner and in synchronism with shaft 18. The three retainer plates on the right side of the device are prevented from rotating by shaft 100. As seen most clearly in FIG. 5, knockout shafts 91 and 92 overlie the key positioning arms of those clutches located on the right side of the device. These knockout arms are supported by the rightwardly extending arms of knockout slides 78 and move downwardly at the same time as shafts 76 and 77.

Referring to FIGS. 5 and 6, shaft 17 is supported at its ends by bearings 101 and 103 while shaft 18 is supported at its ends by bearings 102 and 104. Bearings 101 and 102 are held in place against inverted V shaped portions of the casting by bearing retainer 105. Bearing retainer 105 is held by screw 106, which, in turn, is held by the casting. Bearings 103 and 104 are held similarly by a bearing retainer, not shown. Cam shaft 79 is supported by bearings 107 at its front and rear ends, the rear bearing not shown. Bearing retainers 108 and 109 position bearings 107 against a V shaped portion of the casting and are held in place by bolts. Shaft 25 is held in place by bolts against inverted V shaped portions of the casting at its front and rear.

If desired, the device may be provided with a means to prevent the sticking of the clappers, operable from cam shaft 79 which means are conventional and have not been illustrated. The clappers would, of course, be freed to prevent hanging prior to the time during each half-cycle of shaft rotation when output pulses from the decoding matrix are applied to the solenoids.

Referring to FIGS. 8*a–c*, the sequence of operation of the device may be seen. FIG. 8*a* graphically depicts the motion of intermittent motion shafts 17 and 18 in which angular position is plotted along the abscissa and angular velocity is plotted along the ordinate. The shafts are seen to have their lowest velocity at the 0° and 180° position and their maximum velocity at the 90° and 270° positions.

The motion of a key positioning arm is depicted in graphical form in FIG. 8*b*. Displacement of the arm away from its vertical receiving slot in the outer housings of the clutches is represented by ordinate values. The maximum distance of the key positioning arm away from its vertical slot is represented by the horizontal dashed line. Although the graph shows the movement of only one key positioning arm, it is understood that all of the arms operate in the identical manner and the graph is representative thereof. Assume, for purpose of understanding, that the arm represented in the graph is moved inwardly into its vertical slot every half revolution of the drive shaft. The arm is in its most inward (near the key) position when the shaft is at its lowest velocity. This is the period when the key and the shaft are at the 0° or 180° period. As the shaft rotates away from the 0° or 180° position, the downward movement of the knockout shafts causes the arm to rotate away from the vertical slot. As the knockout shafts are raised, the arm rotates back toward its vertical slot. The arm is completely inserted into its vertical slot a short time prior to the arrival of the key carried by the inner housing. If an arm is to remain away from its vertical slot and not retain its key in the driver keyslot, this position of the arm is indicated by the dotted line and occurs when the associated solenoid is not energized during that half cycle of shaft rotation.

FIG. 7*c* illustrates the time sequence in which output pulses from the key decoding matrix or similar input means are applied to a solenoid. These voltage pulses are applied at the time during the half cycle of rotation when the key positioning arms are furthest removed from the ends of the associated clappers. Thus, the clappers are free to move without interference from the horizontal portion of the key positioning arms.

While the invention has been particularly shown and described with reference to a preferred embodiment thereof, it will be understood by those skilled in the art that the foregoing and other changes in the form and details may be made without departing from the spirit and scope of the invention.

What I claim is:

1. A convertor comprising a rotatable shaft, a first ring eccentrically mounted on said shaft, a second ring eccentrically mounted on said shaft, said first ring contained within a cut-out portion in said second ring, a first clutch for selectively coupling said shaft to said first ring, a second clutch for selectively coupling said shaft to said second ring, means providing coded pulses indicative of a binary quantity to said clutches, said clutches operative in response to said pulses to rotate said first and second rings to either of two positions spaced 180° apart, one position of each ring representative of a zero and the other representative of a one in the binary notation, a housing surrounding said rings, said housing being movable in response to the rotation of said rings, the rotation of said second ring causing twice the movement of said housing as the rotation of said first ring, a pivoted member having one end attached to said housing and its other end free, whereby the displacement of the free end of said member is representative of the decimal equivalent of the binary quantity represented by the position of said rings.

2. The device of claim 1 in which said pulses are applied to said clutches twice during each revolution of said shaft.

3. The combination of convertor means comprising a plurality of rings, rotatable means supporting said rings, said rings mounted eccentrically on said support means, clutch means for independently rotating said rings to one of two positions, one position of each ring representative of a zero and the other position representative of a one in binary notation, a pivoted member which is displaced in response to the movement of said rings, each ring producing a different amount of displacement, the displacement of said pivoted member being representative of the decimal equivalent of the binary quantity represented by said rings, and wherein said clutch means includes a housing having a key passage therein, a key slidably contained within said passage, a driver within said inner housing attached to and rotatable in synchronism with said rotatable support means, a keyslot on the periphery of said driver, means within said housing for biasing said key away from said driver keyslot, and means for sliding said key in said passage to cause engagement with said keyslot, whereby said housing is rotated when said key engages the keyslot of said driver and is stationary when said key is not in engagement with said keyslot.

4. A convertor comprising a support, a first ring eccentrically mounted on said support, a second ring mounted on said support and surrounding said first ring, said first ring being contained in a cut-out portion of said second ring, means for rotating each ring to one of two positions, one position of each ring representative of a binary zero and the other position representative of a binary one, a pivoted member, means repsonsive to the movement of said rings to cause displacement of said pivoted member, the rotation of said second ring causing twice the displacement of said pivoted member as the rotation of said first ring, whereby the displacement of said pivoted member is representative of the decimal equivalent of the binary quantity represented by the positions of said rings.

5. The convertor of claim 4 in which said means responsive to the movement of said rings is a housing having a cut-out portion therein, said second ring being contained within the cut-out portion of said housing.

6. A convertor comprising a pair of rotatable shafts; a first ring mounted eccentrically on one shaft and a second ring mounted eccentrically on the other shaft; solenoid-operated clutches for selectively rotating said rings to either of two positions, one position of each ring representative of a zero and the other position representative of a one in binary notation; said rings being rotated by a pair of solenoid-operated clutches which, when energized, couple the rotary motion of said shafts to said rings; a link; a first housing positioned about said first ring; said first housing being responsive to the rotation of said first ring; a second housing positioned about said second ring; said second housing being responsive to the rotation of said second ring; said first and second housings attached to opposite ends of said link; a rotatable member connected to said link at a point which is one-third the length of the link; said member being displaced by the rotation of said rings a distance which is proportional to the decimal equivalent of the binary quantity represented by the position of said rings.

7. The convertor of claim 6 including means for applying coded pulses representative of a binary quantity to said clutches, the position into which said rings are rotated being determined by said pulses.

8. A convertor comprising a first and a second support, a first plurality of rings mounted eccentrically on said first support and a second plurality of rings mounted eccentrically on said second support, means for independently rotating each of said rings to one of two positions, one position of each ring representative of a one and the other position representative of a zero in binary notation, first housing responsive to the rotation of the rings of said first plurality, second housing responsive to the rotation of the rings of said second plurality, a link, said first housing attached to one end of said link and said second housing attached to the other end of said link, a pivoted member having one end connected to said link, whereby the rotation of said rings causes the other end of said member to be rotated a distance which is proportional to the decimal equivalent of the binary quantity represented by the positions of said rings.

9. The convertor of claim 8 in which said pivoted member is connected to said link at a point which is closer to said first housing than to said second housing.

10. The convertor of claim 9 in which the rings of each plurality are of progressively larger diameters so as to have a weighted effect on the movement of its associated housing.

11. The convertor of claim 10 in which each ring of each plurality is contained within a cut-out portion of the next larger ring, the largest ring of each plurality being contained within its associated housing.

12. The convertor of claim 11 in which each ring has a solenoid-operated clutch associated therewith for rotating said ring about its support.

13. The convertor of claim 12 including a means for applying coded pulses to said clutches, said pulses representative of a binary quantity.

References Cited by the Examiner

UNITED STATES PATENTS

| | | | |
|---|---|---|---|
| 1,088,723 | 3/1914 | Rathsam | 192—28 |
| 2,073,921 | 3/1937 | Caracristi | 235—61 |
| 2,179,822 | 11/1939 | Imm | 235—61 |
| 2,579,220 | 12/1951 | Vine | 235—61 |
| 2,671,609 | 3/1954 | Davidson | 235—61 |
| 2,754,687 | 7/1956 | Brandon | 235—61 |
| 2,756,927 | 7/1956 | Hall | 235—61 |
| 2,858,388 | 10/1958 | Eastman | 192—28 X |
| 2,859,631 | 11/1958 | Spahr | 74—112 |
| 2,973,898 | 3/1961 | Reynolds | 235—61 |
| 3,005,355 | 10/1961 | Mason | 74—112 |
| 3,017,976 | 1/1962 | Uffman | 192—28 X |
| 3,116,014 | 12/1963 | Aymar | 235—61 |

FOREIGN PATENTS

| | | |
|---|---|---|
| 388,691 | 1/1924 | Germany. |

OTHER REFERENCES

Gizeski, T., "Digital Positioning," Instruments and Control Systems, May 1961, vol. 34, page 872.

LOUIS J. CAPOZI, *Primary Examiner.*

LEO SMILOW, *Examiner.*

W. F. BAUER, C. G. COVELL, *Assistant Examiners.*